US006200081B1

(12) United States Patent
Ferrari et al.

(10) Patent No.: US 6,200,081 B1
(45) Date of Patent: Mar. 13, 2001

(54) MOUNTING DEVICES WITH AN EXTERNALLY RIBBED ANCHOR, IN PARTICULAR FOR FURNITURE HINGES

(75) Inventors: Franco Ferrari, Località Deviscio, 2, 23900 Lecco; Carlo Migli, Lecco, both of (IT)

(73) Assignee: Franco Ferrari (IT)

( * ) Notice: Subject to any disclaimer, the term of this patent is extended or adjusted under 35 U.S.C. 154(b) by 0 days.

(21) Appl. No.: 09/471,367

(22) Filed: Dec. 23, 1999

(30) Foreign Application Priority Data

Dec. 23, 1998 (IT) .......................................... MI9800823 U

(51) Int. Cl.[7] ..................................................... F16B 13/04

(52) U.S. Cl. .............................. 411/80; 411/79; 411/57.1; 411/354

(58) Field of Search ............................... 411/32, 33, 57.1, 411/71, 72, 79, 80, 354

(56) References Cited

U.S. PATENT DOCUMENTS

| | | | | |
|---|---|---|---|---|
| 3,192,820 | * | 7/1965 | Pitzer | 411/33 |
| 5,526,661 | * | 6/1996 | Lin | 411/354 X |
| 5,613,795 | | 3/1997 | Salice . | |
| 5,651,650 | * | 7/1997 | Herb et al. | 411/79 X |
| 5,711,054 | | 1/1998 | Salice . | |
| 6,044,673 | * | 4/2000 | Jefferson | 411/80 X |

FOREIGN PATENT DOCUMENTS

| | | |
|---|---|---|
| 0684359 | 11/1995 | (EP) . |
| 0686779 | 12/1995 | (EP) . |
| 0755640 A1 | 1/1997 | (EP) . |

* cited by examiner

*Primary Examiner*—Neill Wilson
(74) *Attorney, Agent, or Firm*—Shlesinger, Fitzsimmons & Shlesinger

(57) ABSTRACT

An expansion fastener for hardware elements for furniture comprises an externally ribbed anchor (11) in which an insert (13) is fitted, which insert has a cam surface (14) sliding on a corresponding cam surface (15) in the anchor body for causing a radial expansion of the anchor when the insert is moved by pulling means (16). The insert (13) comprises a fitting end (17) extending radially in a region free from the anchor body and is secured to the pulling means to be susceptible of inclination in the extension direction of said end (17). On axial movement towards the expansion position, the insert slides on the cam surface to receive a thrust for inclination and move said end outwardly of the anchor and towards the pulling direction.

11 Claims, 1 Drawing Sheet

MOUNTING DEVICES WITH AN EXTERNALLY RIBBED ANCHOR, IN PARTICULAR FOR FURNITURE HINGES

BACKGROUND OF THE INVENTION

The present invention relates to mounting devices involving an externally ribbed or toothed anchor, adapted for mounting of hardware for furniture, in particular hinges.

In the hardware field for furniture, the problem of providing quick, safe and sometimes removable fastening to the different hardware elements is known. Hinges formed of a base to be fastened to the piece of furniture and a bowl to be fastened to the door are a typical example thereof. Use of such anchors has been proposed. However, the proposed solutions are generally complicated, expensive, of slow use and sometimes poor security.

It is a general object of the present invention to eliminate the above mentioned drawbacks, by providing anchor fasteners that are quick, unexpensive and safe.

SUMMARY OF THE INVENTION

In view of the above object, in accordance with the invention an expansion fastener has been conceived for hardware elements for furniture which comprises a ribbed anchor body made of a material which is at least radially flexible and in which an insert is fitted, which insert has a cam surface sliding on a corresponding cam surface in the anchor body to cause radial expansion of same on its movement through pulling means in an axial direction relative to the anchor between a first rest position and a second expansion position, characterised in that the insert comprises a fitting end radially extending in a region free from the anchor body, the insert being secured to the pulling means to be susceptible of inclination in the extension direction of said end, on its axial movement towards the expansion position the insert sliding on the cam surface to receive a thrust for inclination and move said end outwardly of the anchor and towards the pulling direction.

BRIEF DESCRIPTION OF THE DRAWINGS

For better explaining the innovatory principles of the present invention and the advantages it offers over the known art, possible embodiments applying these principles will be given hereinafter, by way of non-limiting example, with the aid of the accompanying drawings. In the drawings.

DETAILED DESCRIPTION OF THE INVENTION

Figure 1:
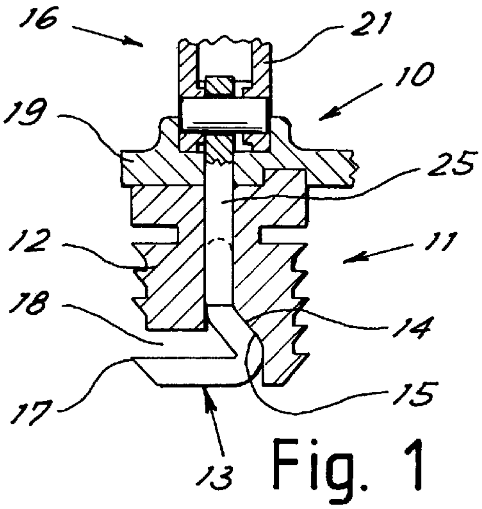
FIG. 1 is a section view of a fastener in accordance with the invention, in a rest position.

With reference to the drawings, a first expansion fastener for hardware elements for furniture is shown in FIG. 1 and generally identified by 10. Fastener 10 comprises a ribbed anchor 11 with a body 12 having an externally ribbed or toothed surface, made of a material which is flexible or yielding at least radially, and in which an insert 13 is fitted.

Figure 2:
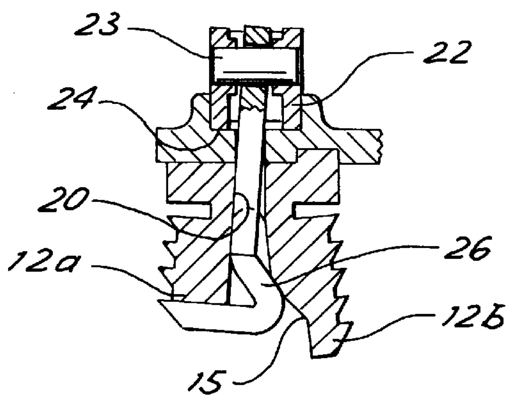
FIG. 2 is a view similar to that in FIG. 1, but with the fastener in an anchor-expansion position.

Insert 13 is provided with a cam surface 14 sliding on a corresponding cam surface 15 in the anchor body to cause radial expansion of same when the hereinafter described causes pulling means 16 axial sliding of the insert from a first rest position (shown in FIG. 1) to a second expansion position (shown in FIG. 2).

Insert 13 comprises a fitting end 17, advantageously with a tapered head edge, which extends radially of the anchor at a region 18 free from the anchor body. As viewed from FIG. 2, insert 13 is secured to the pulling means 16 to be susceptible of inclination in the extension direction of end 17. In this way, on its axial movement towards the anchor expansion position, insert 13 slides on the cam surface 15 to move said end 17 outwardly of the anchor and towards the pulling direction. This causes fitting of end 17 into the wall of the hole where the anchor is inserted and pulling of the anchor inwardly of the hole, thereby ensuring both its holding and adhesion without clearances of the fastener body 19 against the surface of the piece of furniture.

Still in accordance with one of the innovatory principles of the invention, the insert 13 rests on the anchor body also at a position 20 radially opposite to that of the cam surface 15 to produce a thrust to expansion at this rest region as well, on inclination of the insert itself. Thus a perfect expansion of the anchor occurs, which is, for example, accomplished by a body divided into two halves relative to the insert plane so as to form two externally ribbed fingers 12*a* and 12*b* moving away outwardly in opposite direction relative to the anchor axis.

Advantageously, the pulling means 16 comprises a lever 21 with an end 22 pivotally mounted to the insert at 23 in a loose manner and carrying a cam surface 24 acting to move the pivotal mounting away from the anchor on rotation of the lever from a first position (a vertical position for example, as shown in FIG. 1) to a second position (a horizontal position in FIG. 2), corresponding to said rest and expansion positions. The insert 13 is advantageously made of a partially folded element so that, when in a rest position, it has a first portion 25 close to the pulling means, substantially parallel to the anchor axis, a second portion 26 inclined to the anchor axis, to make said cam surface 14, and a third portion directed transversely of the anchor axis to form said fitting end 17. The first, second and third portions are substantially rectilinear.

Surface 15 is rectilinear as well, its inclination being substantially the same as that of portion 26 when the insert is in a rest position.

Figure 3:
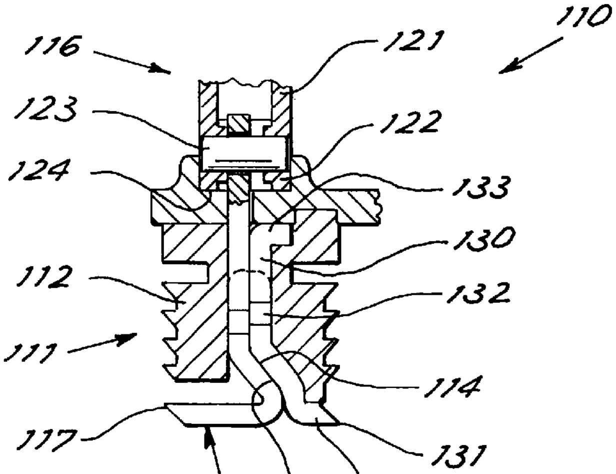
FIG. 3 is a section view of a second fastener in accordance with the invention, in a rest position.
Figure 4:
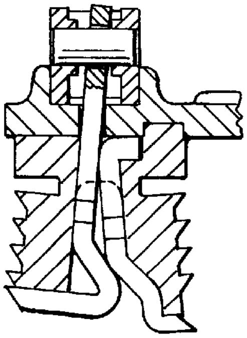
FIG. 4 is a view similar to that in FIG. 3 but with the fastener in an anchor-expansion position.

An alternative embodiment is shown in FIGS. 3 and 4. For convenience, elements similar to those of the preceding embodiment will be allocated the same reference numerals as in FIGS. 1 and 2, but increased by 100. Thus, there is a fastener 110 comprising an anchor 111 with a body 112 having externally ribbed or toothed surfaces, and an insert 113 provided with a cam surface 114 sliding on a corresponding cam surface 115 in the anchor body to cause radial expansion of same when pulling means 116 drives axial sliding of the insert between a first rest position (shown in FIG. 3) and a second expansion position (shown in FIG. 4).

Insert 13 has a fitting end 117.

The pulling means can still comprise a lever 121 with an end 122 pivotally mounted at 123 to the insert in a loose manner and carrying a cam surface 124 acting to move the pivotal mounting away from the anchor on rotation of the lever.

Unlike the embodiment in FIG. 1, the cam surface 115 on the anchor body is made up of a flat metal element 130 inserted in the anchor. This element has a fitting end 131 directed outwardly of the anchor, opposite to the insert end 117, so as to bite into the wall material of a hole into which the anchor is introduced. Element 130 enables a greater expansion force to be developed, thereby ensuring an improved holding and less possibilities of damages to the anchor.

The metal element has an intermediate portion 132 directed parallelly of the anchor axis and end portions 133, 134 bent outwardly of the anchor to constitute a stop to axial sliding of the metal element within the anchor.

Figure 5:
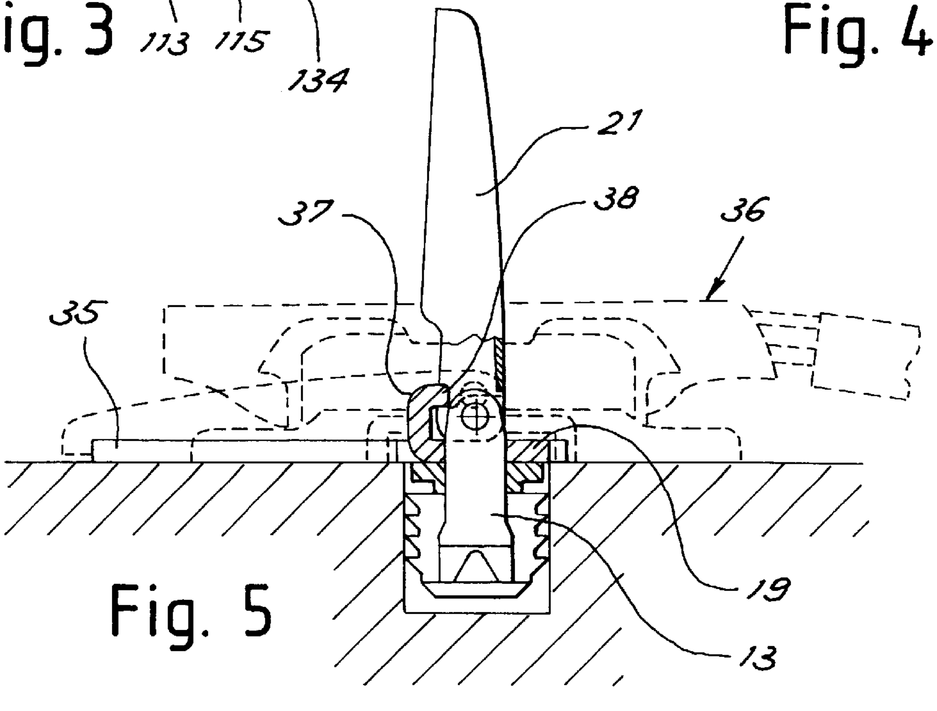
FIG. 5 is a diagrammatic section view of a fastener for a hinge base.

Shown in FIG. 5 is a fastener in accordance with the invention (with the anchor axially rotated through 90° relative to FIGS. 1–4) integrated into a base 35 for fastening of a wing 36 of a hinge of known type and therefore not further shown or described.

As shown in FIG. 5, lever 21 or 121 may have a fitting surface 37 in a corresponding blocking surface 38 to prevent movement of the insert towards the expansion direction when the lever is in the first rest position, shown in solid line in FIG. 5. The expansion position of lever 21 is shown in chain line.

At this point it is apparent that the intended purposes have been achieved.

Obviously, the above description of an embodiment applying the innovatory principles of the present invention is given by way of example only and therefore must not be considered as a limitation of the scope of the invention as herein claimed.

For example, the sizes of the different parts may vary depending on the specific requirements.

What is claimed is:

1. An expansion fastener for hardware elements for furniture, comprising an externally ribbed anchor body for insertion in a furniture bore hole, and made of a material which is at least radially flexible, an insert mounted for axial movement in a bore in said body and having thereon a cam surface slidably engaged with a corresponding cam surface in the anchor body and operative to cause radial expansion of said body upon movement of said insert in an axial direction relative to the anchor body from a rest position to an expansion position, and characterized in that said insert comprises a fitting end extending radially of the anchor body axis in a region free from the anchor body, the insert being susceptible of inclination in the extension direction of said fitting end, and upon axial movement thereof towards said expansion position the insert having the cam surface thereof sliding on the cam surface on said anchor body thereby to move said fitting end outwardly to anchor the insert and draw the anchor body into the furniture bore hole.

2. A fastener as claimed in claim 1 including pulling means connected to said insert and comprising a lever with an end pivotally connected in a loose manner to said insert and carrying a cam surface acting to move a pivotal mounting away from the anchor body on rotation of the lever from a first position to a second position, corresponding to said rest and expansion positions.

3. A fastener as claimed in claim 1, wherein the insert rests on the anchor body also at a position radially opposite to that of the anchor body cam surface to produce a thrust to effect expansion of the body in this rest region as well, on inclination of the insert.

4. A fastener as claimed in claim 1, wherein the insert is made of a partially folded element so that, when in a rest position, said insert has a first portion substantially parallel to the anchor body axis, a second portion inclined to the anchor axis, to make said cam surface on the insert and a third portion directed transversely of the anchor axis to form said fitting end.

5. A fastener as claimed in claim 4, wherein the first, second and third portions are substantially rectilinear.

6. A fastener as claimed in claim 4, wherein portion is substantially rectilinear and slides on said cam surface on the anchor body, which is also substantially rectilinear and substantially has the same inclination.

7. A fastener as claimed in claim 1, wherein the cam surface on the anchor body is made of a flat metal element inserted in said bore in the anchor body.

8. A fastener as claimed in claim 7, wherein the metal element has a fitting end directed outwardly of the anchor body opposite to said insert fitting end.

9. A fastener as claimed in claim 7, wherein the metal element has an intermediate portion directed parallelly of the anchor body axis and end portions bent outwardly of the anchor body to constitute a stop to axial sliding of the metal element within the anchor.

10. A fastener as claimed in claim 2, wherein the lever has a fitting surface in a corresponding blocking surface to prevent movement of the insert towards the expansion direction when said lever is in the first, rest position.

11. A fastener as claimed in claim 1, wherein said fastener constitutes a fastening base for a hinge wing.

* * * * *